United States Patent
Dinwoodie et al.

Patent Number: 6,061,978
Date of Patent: May 16, 2000

[54] VENTED CAVITY RADIANT BARRIER ASSEMBLY AND METHOD

[75] Inventors: Thomas L. Dinwoodie, Piedmont; Adam D. Jackaway, Berkeley, both of Calif.

[73] Assignee: PowerLight Corporation, Berkeley, Calif.

[21] Appl. No.: 09/104,027

[22] Filed: Jun. 24, 1998

Related U.S. Application Data

[63] Continuation-in-part of application No. 09/019,427, Feb. 5, 1998
[60] Provisional application No. 60/050,769, Jun. 25, 1997, and provisional application No. 60/072,894, Jan. 28, 1998.

[51] Int. Cl.[7] .................................................. E04D 13/18
[52] U.S. Cl. ..................... 52/173.3; 52/302.1; 52/302.3; 52/506.06; 136/244
[58] Field of Search ............................ 52/173.3, 506.06, 52/302.1, 302.3; 136/244, 291

[56] References Cited

U.S. PATENT DOCUMENTS

| | | |
|---|---|---|
| 3,769,091 | 10/1973 | Leinkram et al. . |
| 4,040,867 | 8/1977 | Forestieri et al. . |
| 4,189,881 | 2/1980 | Hawley . |
| 4,321,416 | 3/1982 | Tennant . |
| 4,389,533 | 6/1983 | Ames . |
| 4,674,244 | 6/1987 | Francovitch . |
| 4,677,248 | 6/1987 | Lacey . |
| 4,835,918 | 6/1989 | Dippel . |
| 4,860,509 | 8/1989 | Laaly et al. . |
| 4,886,554 | 12/1989 | Woodring et al. . |
| 4,937,990 | 7/1990 | Paquette ............................ 52/302.3 X |
| 5,092,939 | 3/1992 | Nath et al. . |
| 5,112,408 | 5/1992 | Melchior . |
| 5,316,592 | 5/1994 | Dinwoodie . |
| 5,338,369 | 8/1994 | Rawlings . |
| 5,473,847 | 12/1995 | Crookston ........................... 52/302.3 X |
| 5,505,788 | 4/1996 | Dinwoodie . |
| 5,524,401 | 6/1996 | Ishikawa et al. . |
| 5,647,915 | 7/1997 | Zukerman . |
| 5,651,226 | 7/1997 | Archibald .................................. 52/518 |
| 5,653,222 | 8/1997 | Newman .................................. 126/653 |
| 5,746,839 | 5/1998 | Dinwoodie . |

FOREIGN PATENT DOCUMENTS

| | | |
|---|---|---|
| 3611542 | 8/1987 | Germany . |
| 59-175168 | 10/1984 | Japan . |
| 59-175169 | 10/1984 | Japan . |
| 3-200376 | 2/1991 | Japan . |
| 05280168 | 10/1993 | Japan . |

OTHER PUBLICATIONS

Product Info: PowerLight Corporation, PowerGuard™ System Description / Product Description, 1995.
Product Info: Roof Science Corporation, WhiteCap Radiative Cooling Systems, 1998.
Product Info: Roof Science Corporation, WhiteCap Integrated Cooling, 1998.

*Primary Examiner*—Christopher T. Kent
*Attorney, Agent, or Firm*—Townsend and Townsend and Crew LLP

[57] ABSTRACT

A vented cavity radiant barrier assembly (2) includes a barrier (12), typically a PV module, having inner and outer surfaces (18, 22). A support assembly (14) is secured to the barrier and extends inwardly from the inner surface of the barrier to a building surface (14) creating a vented cavity (24) between the building surface and the barrier inner surface. A low emissivity element (20) is mounted at or between the building surface and the barrier inner surface. At least part of the cavity exit (30) is higher than the cavity entrance (28) to promote cooling air flow through the cavity.

50 Claims, 11 Drawing Sheets

VENTED CAVITY RADIANT BARRIER ASSEMBLY AND METHOD

CROSS-REFERENCE TO RELATED APPLICATIONS

This application claims the benefit of the following two provisional patent applications: Provisional Application Ser. No. 60/050,769, filed Jun. 25, 1997, entitled "Vented Cavity Radiant Barrier Building Assemblies", and Provisional Application Ser. No. 60/072,894, filed Jan. 28, 1998, of the same title. This application is also a continuation-in-part of U.S. patent application Ser. No. 09/019,427, filed Feb. 5, 1998, entitled "Photovoltaic Building Assembly With A Continuous Insulation Layer".

BACKGROUND OF THE INVENTION

This invention generally relates to exterior building roofing/cladding assemblies, and in particular, to the inclusion of vented radiant barrier systems within such assemblies, configured to provide: radiant and convective thermal regulation of building envelopes, displacement of conventional ballast materials, extension of building shell material life, and supporting structure for photovoltaic modules.

Thermal insulation of buildings, to help keep the building interiors cool in the summer and warm in the winter, has always been a key design criterion in all but the mildest of climates. Conventional thermal insulation primarily involves insulating the walls and roofs to minimize conductive heat transfer. However, heat transfer by convection and radiation to and from building surfaces may also be significant.

SUMMARY OF THE INVENTION

The present invention is directed to a vented cavity radiant barrier assembly, finding particular utility using a photovoltaic (PV) module as the barrier, which reduces the heating and cooling requirements of a building by reducing heat transfer into the building during cooling periods and reducing heat loss from the building during heating periods. The radiant barrier assembly may also help insulate the building surface from the effects of wind, rain, and other conditions. The invention is adaptable for use on building surfaces which are vertical, horizontal or inclined.

The vented cavity radiant barrier assembly includes a barrier, typically a PV module, having inner and outer surfaces. A support assembly is secured to the barrier and extends inwardly from the inner surface of the barrier to a building surface creating a vented cavity between the building surface and the barrier inner surface. A low emissivity (low-e) element is associated with the inner surface; that is, one or more low-e surfaces are positioned at or between the building surface and the inner surface of the barrier.

The support assembly is typically secured to the building surface in a manner which does not create penetrations into the building surface. This can be achieved, for example, by the use of adhesives, hook and loop fasteners or embedding the base of support assembly elements within a layer of insulation covering the roofing surface. It may also be achieved by designing the assembly to minimize wind uplift, by laterally coupling adjacent assemblies into an integrated array of assemblies, by the use of ballast-type elements and by other ways. In some situations, such as when each assembly is in the form of a shingle, fasteners which penetrate the building surface may be used.

The low emissivity element is typically provided at the inner surface of the barrier. Doing so minimizes manufacturing difficulties, simplifies installation, reduces weathering to the low-e surface and increases quality control because the entire assembly can be made at the factory.

Placing the low-e element at the roofing surface eliminates the potential increase in temperature of the PV module. However, this placement also subjects the low-e surface to greater environmental degradation, such as oxidation and other chemical attacks from dust, dirt and other airborne pollutants, as well as being obscured by dust and dirt which also reduces the effectiveness of the low-e surface. Also, because the low-e element must typically be applied to the building surface in the field, there is a reduction in quality control as opposed to having the low-e element applied at the factory.

Using the low-e element suspended within the vented cavity between the inner surface of the barrier and the building surface, provides the best thermal performance of any single position for the low-e element, apparently because it creates a double vented cavity. It, however, is the most complex and expensive to make and install. The increase in complexity and expense may often outweigh the advantages resulting from its enhanced thermal effectiveness.

Using a low-e element at more than one location, typically at the inner surface of the barrier and at the building surface, can often enhance thermal performance. This enhanced thermal performance may be useful or necessary in certain applications. However, it is expected that for many applications the use of low-e elements at locations other than at the inner barrier surface will not be cost effective.

In some situation the barrier is not a PV module but rather is a thermal insulator. In such cases the outer surface of the barrier is preferably a high reflectivity, high emissivity surface. This, coupled with the low emissivity surface associated with, and typically at, the inner surface of the barrier, provides for enhanced thermal performance of the system.

The assembly is preferably made such that convective air flow through the vented cavity is enhanced by creating the cavity with at least part of the cavity exit higher than the cavity entrance. This is typically achieved automatically when assemblies are mounted to a vertical building surface, such as a wall, or an inclined building surface, such as a sloped roof. When the building surface is essentially horizontal, the barrier can be mounted to the generally horizontal building surface at an angle to the horizontal so to promote airflow through the vented cavity. In addition, or alternatively, air can be urged to pass through the vented cavity by the use of, for example, a wind vent. While a fan could also be used, it is preferred that the system be passive to help reduce energy costs, lower installations costs, and reduce system complexity. Wind deflectors may be used adjacent to the cavity entrance to help deflect wind into the cavity; this may be particularly useful where there is a prevailing wind from a certain direction. The use of wind vents, fans or wind deflectors may be important when it is necessary or desirable to mount the barrier parallel to a generally horizontal building surface.

Another aspect of the invention is one method by which a radiant barrier assembly can be made. A barrier having inner and outer surfaces is selected; a low emissivity element is typically applied to the inner surface of the barrier. A support assembly is mounted to the barrier so that a part of the support assembly extends outwardly away from the inner surface of the barrier. This assembly can thus be mounted to the building surface in a simple and efficient manner.

The invention is also directed to a method for mounting a vented radiant barrier assembly to a building surface. The barrier is secured to the building surface using the support assembly to create a vented cavity between an inner surface of the barrier and the building surface. During the securing step, at least one low-e element is located at or between the inner surface and the building surface. Often this step is carried out with the low-e element adhered to the inner surface of the barrier. The low-e element can also be, for example, sprayed onto the building surface or suspended as a film in the vented region between the building surface and the inner surface of the barrier.

It has been found that a roof having a black roofing surface has a solar absorptance of about 0.85 while a white roofing surface has a solar absorptance of about 0.60. Solar absorptance can be reduced to about 0.50 by covering the roofing surface with a conventional insulating paver made of 5 cm-thick polystyrene covered by about 16 mm of concrete. Suspending a horizontally-positioned radiant barrier (which could be, for example, a PV module or a rigid, weatherable panel) about 1.2 to 10 cm above a flat, horizontal roofing surface reduces the solar absorptance to about 0.35. The solar absorptance is reduced to about 0.30 by the addition of a low-e element along the inner surface of the barrier; placing the barrier at an angle to the horizontal, preferably at least about 5°, causes the cavity entrance to be lower than the cavity exit, creates a natural ventilation air path and reduces the solar absorptance to about 0.

The invention provides not only significant improvements in thermal performance, but also, when the barrier is a PV module, provides a source of nonpolluting electricity from the solar radiation shining on the PV module.

Other features and advantages of the invention will appear from the following description in which the preferred embodiments have been described in detail in conjunction with the accompanying drawings.

DESCRIPTION OF THE PREFERRED EMBODIMENTS

Figure 1:
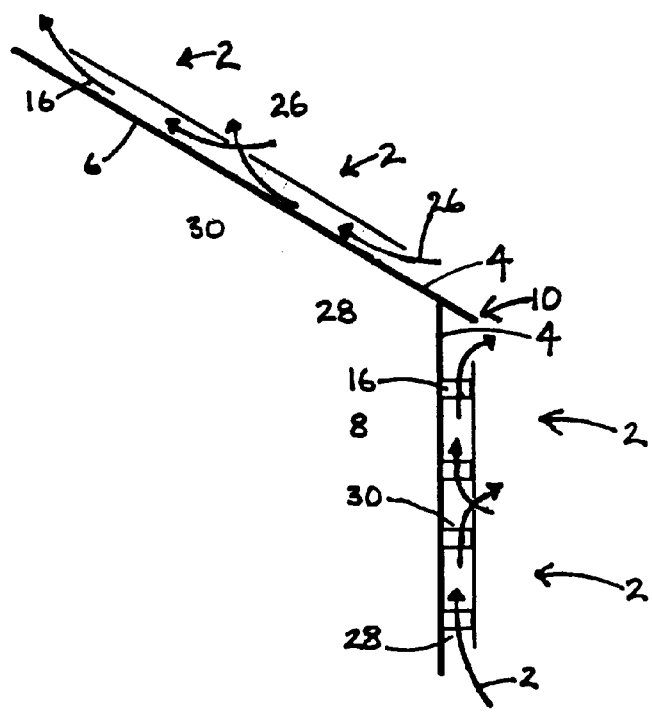
FIG. 1 is a simplified side view showing vented cavity radiant barrier assemblies made according to the invention mounted to a sloping roof and a vertical sidewall of a building.
Figure 2:
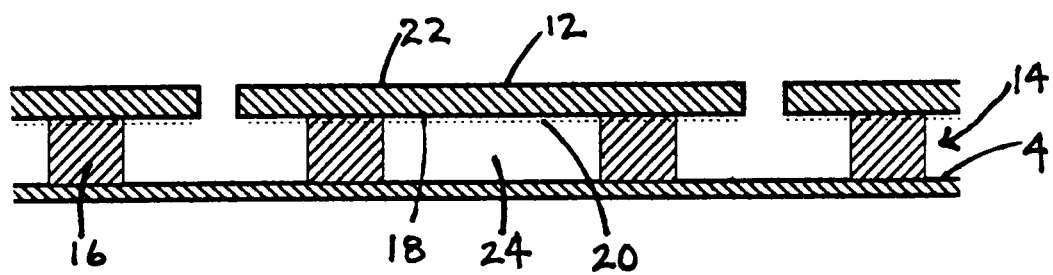
FIG. 2 is a simplified, enlarged side view of one of the barrier assemblies including a low-e element along the inner surface of barrier.

FIGS. 1 and 2 illustrate a number of vented cavity radiant barrier assemblies 2 mounted to various building surfaces 4, in particular a roof 6 and a wall 8 of a building 10. Assembly 2, as shown in FIG. 2, includes a barrier 12, typically a PV module or a rigid, weatherable panel, mounted above building surface 4 by a support assembly 14. When barrier 12 is a PV module, such as one sold by Solarex of Frederick, Maryland as MSX 120, various electrical wires and cables will be used; these are not shown in the drawings for clarity of illustration. When barrier 12 includes a thermal insulation component, it preferably has an insulation value of at least about R2 and preferably about R5 to R15. Suitable materials for the insulation component include polystyrene, polyurethane and isocyanurate.

When a PV module includes a PV panel supported by an insulating layer, the thermal insulating valve of the barrier typically ranges from about R5 to over R20 depending on the type of insulating material used and its thickness.

Figure 1A:
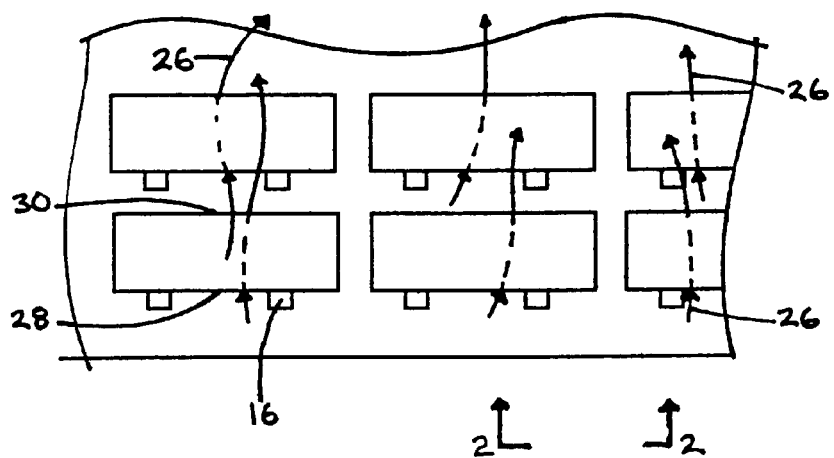
FIG. 1A is a side elevation view of the roof-mounted radiant barrier assemblies of FIG. 1 illustrating the passage of air through the vented cavities.

In the simplified embodiment of FIGS. 1, 1A and 2, support assembly 14 includes four supports 16 secured to and extending downwardly away from the inside surface 18 of barrier 12. Supports 16 are also secured to building surface 4, typically without penetrating building surface 4 as described in more detail below.

Assembly 2 further includes a low emissivity element 20 at inner surface 18. Low-e elements are shown by dashed lines in the figures for ease of illustration. Low-e element 20 is preferably an integral part of barrier 12 at inner surface 18 and can take a variety of forms. Low-e element 20 may include metal foil or metalized plastic such as Mylar®, low-e spray coatings and may be applied to barrier 12 by laminating or painting or spraying. Emissivity is defined as the ratio of total radiating power of a real surface to that of a black body surface. Low-e means having an emissivity typically below 0.4, and preferably below 0.08. Low emissivity is generally a characteristic of shiny metal surfaces. Barrier 12 also includes an outer surface 22. Outer surface 22 may be the solar receiving surface when barrier 12 is a PV module. When barrier 12 is a rigid panel, outer surface 22 may be a high reflectivity, high emissivity surface, such as a white painted surface, for enhanced thermal conditioning of building 10.

Assembly 2 defines a vented cavity 24 between building surface 4 and inner surface 18 of barrier 12. The provision of vented cavity 24 permits free air flow, and thus the flow of cooling air currents as indicated by arrows 26, between barrier 12 and building surface 4. Vented cavity 24 is preferably about 1.2 cm to 10 cm (½ to 4 inches) high and more preferably is about 4.8 cm (1.9 inches) high. In the embodiments of FIG. 1, 1A and 2, vented cavity 24 has a generally uniform height between a cavity entrance 28 and a cavity exit 30. In the embodiment of FIGS. 1 and 1A, the cavity exit 30 is higher than the cavity entrance 28 to help induce cooling air flow through vented cavity 24. This is achieved naturally when assemblies 2 are mounted to vertical walls 8 or inclined roofs 6 as in FIG. 1. The promotion of air flow through vented cavity 24 when radiant barrier assemblies 2 are used on a generally horizontal roof (including a moderately pitched roof of up to about a 2:12 pitch) is achieved through the use of an angled barrier as discussed with reference to FIGS. 5 and 6.

Figure 2A:
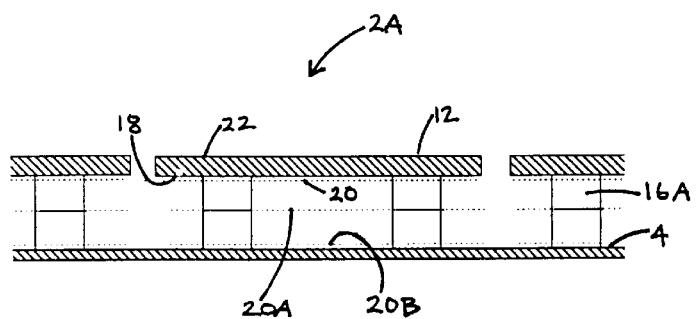
FIG. 2A is a simplified side view of a barrier assembly similar to FIG. 2 but including a low-e element at the building surface and at a position mid-way between the inner surface of the barrier and the building surface.

FIG. 2A illustrates an alternative embodiment of the invention with like elements referred to with like reference numerals. Radiant barrier assembly 2A is shown to include a barrier 12 supported above building surface 4 by segmented supports 16A. Low-e elements 20, 20A and 20B are used at and between inner surface 18 of barrier 12 and building surface 4. Specifically, low-e element 20A is suspended within vented cavity 24 between segmented supports 16A to in effect produce two vented cavities. An example of low-e element 20A is a sheet of galvanized steel, approximately 24 guage. Low-e element 20A can include a low-e surface facing either or both of surfaces 18, 4. Low-e element 20B is typically made by spraying or painting metalized paint on top of building surface 4 prior to installation of assembly 2A. A suitable material for low-e element 20B is sold by Solar Energy Corporation of Princeton, N.J. as LO/MIT-I. As discussed above in the summary, there are advantages and disadvantages relating to the use of low-e elements at inner surface 18, at building surface 4 and between the two surfaces. Based on the particular circumstances, one, two or all three of low-e elements of 20, 20A and 20B may be used with a vented cavity radiant barrier assembly.

Figure 3:
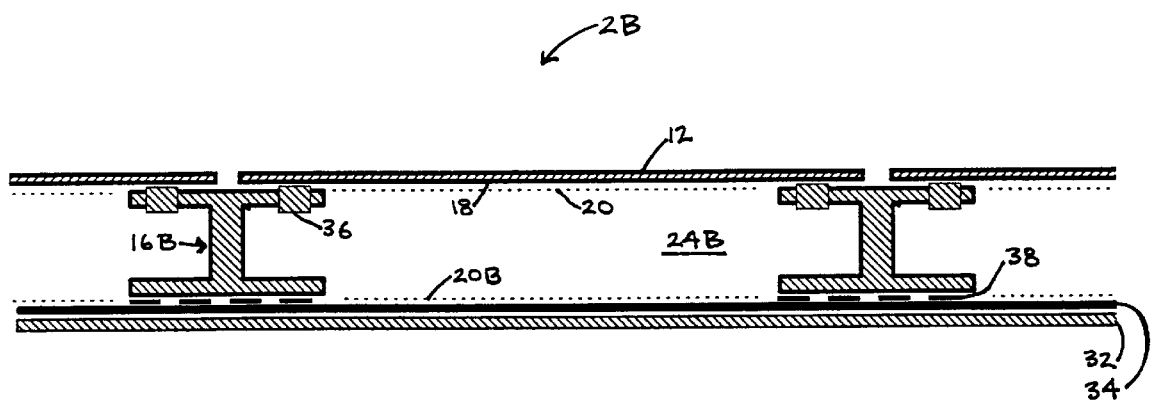
FIG. 3 illustrates an alternative embodiment of the invention of FIG. 2 in which the same support element supports adjacent barriers and low-e elements are provided at the inner surface and at the building surface.

FIG. 3 illustrates a vented cavity radiant barrier assembly 2B in which supports 16B are in the form of I-shaped supports which support the edges of adjacent barriers 12 over building surface 4. Building surface 4 is shown to include a building surface substrate 32 over which a weather-proof membrane 34 is used. In this embodiment low-e element 20B is used at membrane 34, and a low-e element 20 is used at lower surface 18. Supports 16B are secured to inner surface 18 through the use of clips 36 while the lower portion of supports 16B are secured to membrane 34 of building surface 4 through the use of an appropriate adhesive 38. Hook and loop fasteners or other appropriate fastening elements could also be used to secure supports 16B to barrier 12 and to surface 4.

Figure 4:
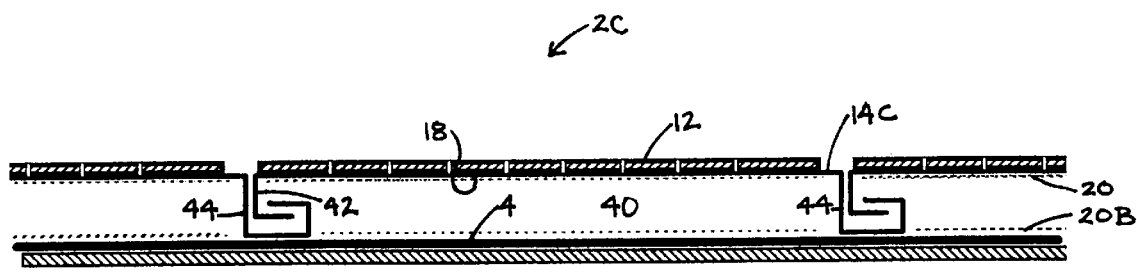
FIG. 4 shows an alternative embodiment of the invention of FIG. 3 in which the support assembly includes interlocking legs along the lateral edges of the barriers.

FIG. 4 shows a further embodiment of the invention in which assembly 2C is shown with a different type of support assembly 14C. Support assembly 14C includes a pan or body 40, supporting barrier 12, and interlocking legs 42, 44 along the lateral edges of body 40. Body 40 in essence forms the inner surface 18 of barrier 12 with low-e element 20 at inner surface 18. Low-e element 20B is applied to building surface 4 as with the embodiment of FIG. 3. Legs 44 are secured to surface 4 using fasteners such as adhesives, hook and loop fasteners, clips, etc. Legs 42 are secured to legs 44 both by their mechanical interlocking illustrated in FIG. 4, and, if appropriate, with the use of an adhesive or sealant between the interlocking portions of the legs. Note that the gaps between legs 42, 44 are exaggerated in FIG. 4 for purposes of illustration.

Figure 4A:
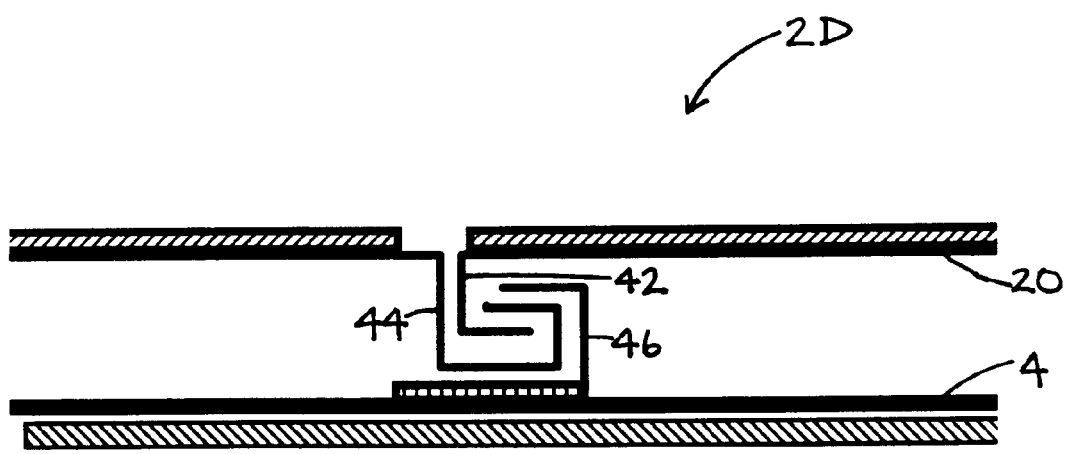
FIG. 4A shows a modified version of the embodiment of FIG. 4 in which interlocking legs are secured to the building surface using a generally U-shaped clip or connector.

FIG. 4A illustrates an alternative to the radiant barrier assembly 2C of FIG. 4. Assembly 2D uses a clip or connector 46 to engage the legs 42, 44 and secure the legs to surface 4. This permits connector 46 to be mounted to surface 4 prior to positioning barrier 12, with pan 40 and legs 42, 44 extending therefrom, onto building surface 4.

Figure 5:
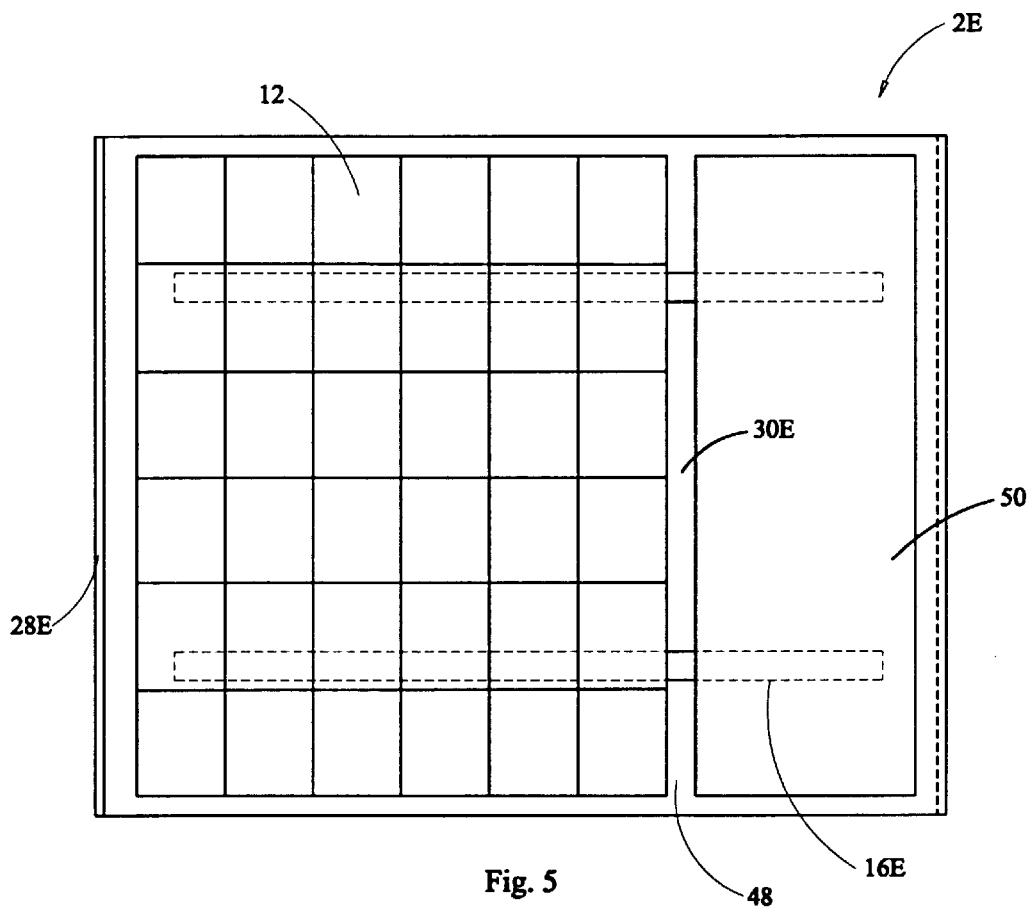
FIGS. 5 and 5A are simplified top plan and side views of a further alternative embodiment of the invention in which the barrier is at an incline and is supported at its lower and upper ends by angled spacers on top of a thermal insulation panel having interlocking projections and recesses which help to eliminate the need for adhering or otherwise fastening the barrier assembly to the building surface.
Figure 5A:
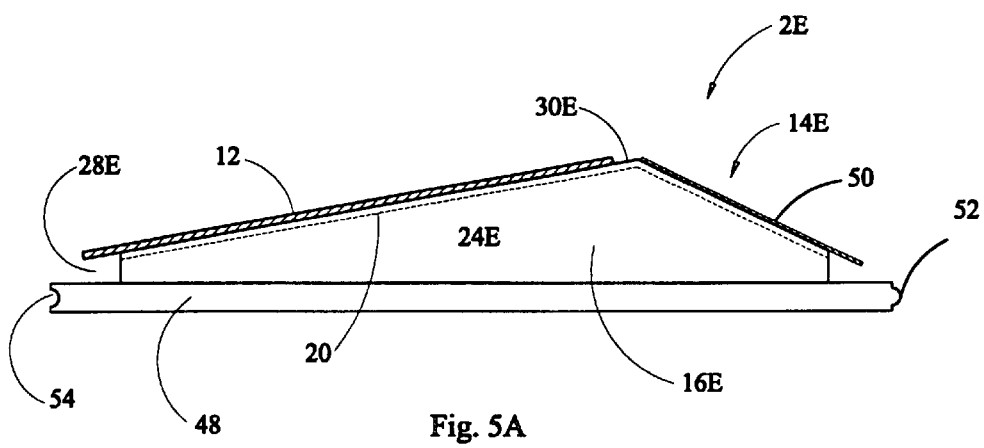

An alternative embodiment of the invention, in which assembly 2E has been designed for use with flat (generally horizontal) roofs, is shown in FIGS. 5 and 5A. Support assembly 14E includes a pair of angled spacers 16E supporting barrier 12 on an incline of at least about 5°, and preferably about 10° to 20° to the horizontal. Spacers 16E are supported by a thermal insulation panel 48. Panel 48 has a projection 52 extending into a recess 54 formed in an adjacent panel 48 to permit interlocking of adjacent assemblies 2E. Vented cavity 24E is open to the atmosphere through the cavity entrance 28E, formed at the lower end of barrier 12, and through a cavity exit 30E. Cavity exit 30E is formed as a gap between the upper end of barrier 12 and a reverse angle deflector panel 50, panel 50 also being supported by spacers 16E. In this manner barrier 12 is inclined for enhanced solar radiation reception at appropriate latitudes and climates and is inclined to cause the cavity entrance to be lower than the cavity exit for enhanced air flow and thus cooling of vented cavity 24E.

Figure 6:
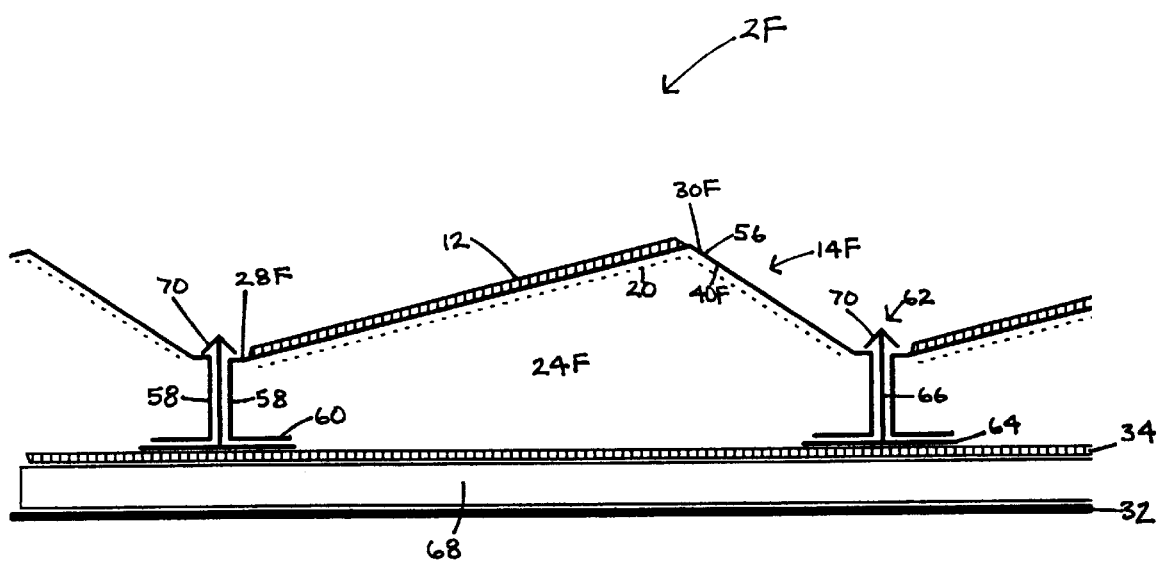
FIG. 6 illustrates a still further embodiment of the invention in which the lower ends of the hold-downs of the support assembly are embedded within a continuous layer of thermal insulation thus securing the radiant barrier assembly to the building surface.

FIG. 6 illustrates a further embodiment of the invention in which assembly 2F has some of the attributes of the embodiments of FIGS. 4 and 5. Support assembly 14F is seen to include a pan 40F supporting barrier 12 at an angle to the horizontal. Pan 40F includes a reverse angle portion 56 which is perforated for air ventilation. Air can enter vented cavity 24F through a cavity entrance 28F, formed by holes formed in pan 40F adjacent to the low end of barrier 12; air flows upwardly through cavity 24F and through cavity exit 30F formed adjacent to the upper end of barrier 12 by the holes in reverse angle portion 56. Support assembly 14F includes a hold down 62 having a base 64 lying adjacent to membrane or coating 34, coating 34 covering a continuous insulation layer 68. Hold down 62 also includes a vertical extension portion 66 extending upwardly away from base 64. Support assembly 14F also includes standoffs or legs 58 extending downwardly from pan 40F; legs 58 have bases 60 which rest on base 64. Extension 66 extends upwardly between legs 58 and terminates in deflectable clips or wings 70 at the outer ends of portion 66. The combination of barrier 12 supported by pan 40F with legs 58 extending from the lateral edges of the pan, can be snapped into place between pairs of hold downs 62. During this final installation step, clips or wings 70 pivot downwardly then snap back to the orientation of FIG. 6 to engage and secure the lateral edges of pan 40F in place.

In the embodiment of FIG. 6, hold downs 62 are indirectly secured to building surface substrate 32 using an adhesive to fasten base 64 to coating 34. It may be desirable to make extension 66 longer and have base 64 be secured directly to building surface substrate 32, preferably with non-surface-penetrating elements such as an adhesive, or with surface-penetrating fasteners such as roofing nails, at appropriate positions. Continuous insulation layer 68 is then applied, typically by spraying foam, such as polyurethane, onto building surface substrate 32. Weatherproof membrane 34 is then applied to continuous insulation layer 68 to provide the desired weatherproofing for the building.

Insulation layer 68 and insulation panel 48 each preferably has an insulation value of at least about R3 per inch (R1.2 per cm). Layer 68 and panel 48 are each typically about 2.5 to 7.5 cm (1 to 3 inches) thick.

Figure 7:
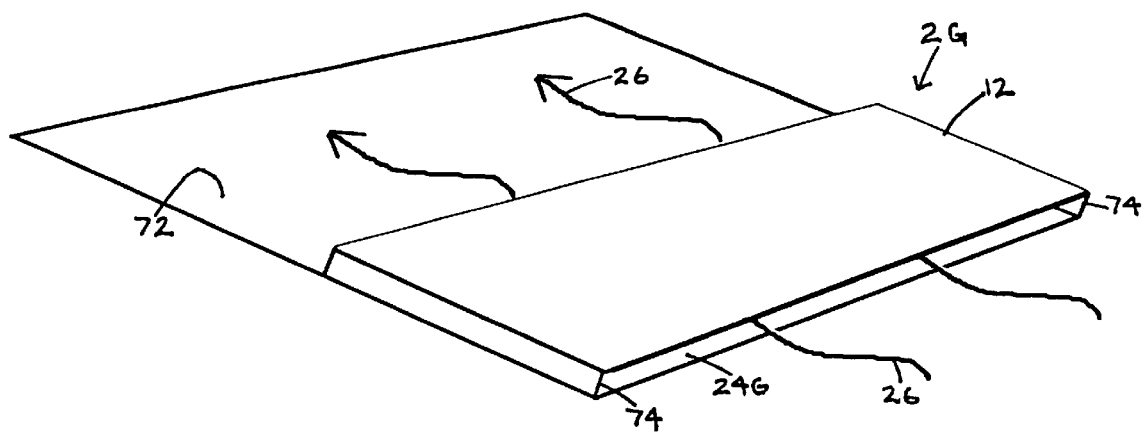
FIG. 7 illustrates another alternative embodiment of the invention in which the radiant barrier assembly is in the form of a shingle.

FIG. 7 illustrates the radiant barrier assembly 2G made in the form of a shingle. Radiant barrier assembly 2G includes a barrier 12 secured to a base 72 by two or more parallel edge spacers 74. As illustrated by arrows 26, air flow between barrier 12 and base 72 provides cooling to vented cavity 24G. Base 72 has a larger surface area than panel 12, preferably at least about 20% larger, to permit assemblies 2G to be mounted as shingles.

Figure 8:
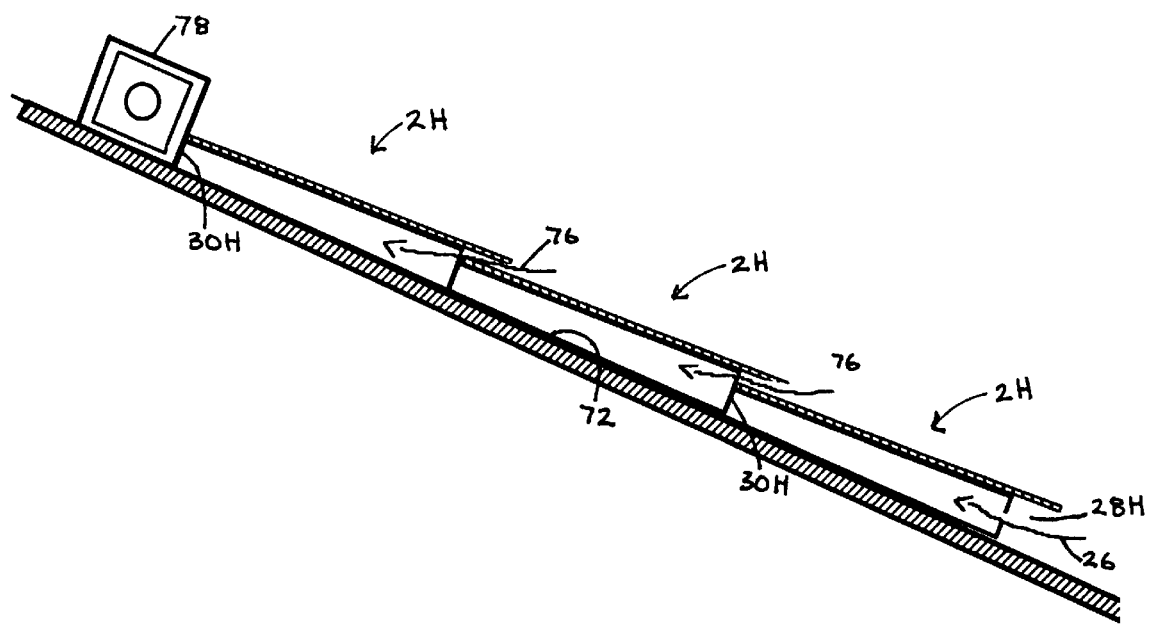
FIG. 8 shows a slightly altered version of the embodiment of FIG. 7 mounted to a sloped roof whereby the air passing through each of the radiant barrier assemblies is collected at a hot air collector.

FIG. 8 illustrates a second shingle-type embodiment of the invention in which radiant barrier assemblies 2H are mounted to abut one another but with the lower ends of vented cavities 24H, defining cavity entrances 28H, being farther from base 72 than the upper ends of vented cavity 24H, that is cavity exits 30H. While the lower-most radiant barrier assembly 2H can have air flow in through its entire cavity entrance 28H, the other barrier assemblies 2H receive ambient air through only the upper-most of their cavity entrances 28H as indicated by arrows 76. A hot air collector 78 can be mounted adjacent to the cavity exit 30H of the upper-most assembly 2H to permit the heated air to be, for example, exhausted to the ambient atmosphere or to be directed directly into the interior of building 10, or to be directed to a heat exchanger.

Low-e element 20 can be used at the inner surface of barriers 12 in both the embodiments of FIGS. 7 and 8 but are not shown in the drawings for clarity. If a low-e element 20B were to be used, it would be applied to the upper surface of base 72 beneath barrier 12. As a shingle element, assemblies 2G and 2H are typically mounted to building surface 4 by the use of roofing nails, not shown.

Figure 9:
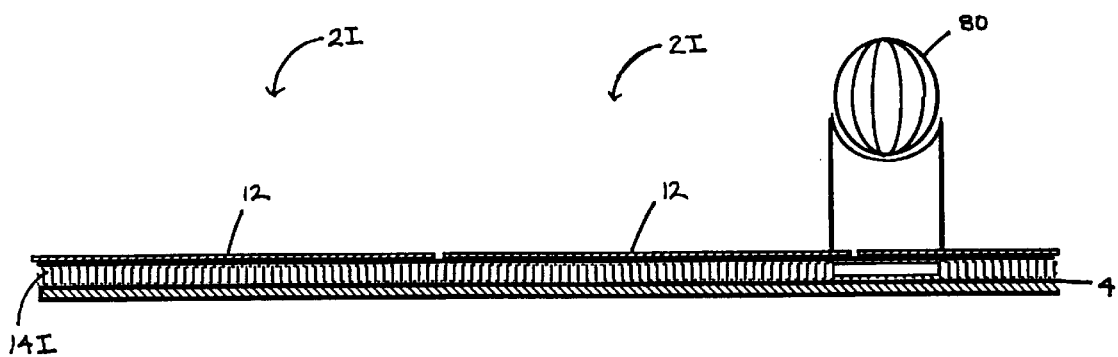
FIG. 9 illustrates a further embodiment of the invention in which the support assembly includes a fluid-permeable substrate which partially or totally fills the vented cavity and supports the barrier but permits air to pass through the fluid permeable substrate so to vent the cavity.

FIG. 9 illustrates a further embodiment of the invention in which assembly 2I includes a barrier 12 and a support assembly 14H in the form of a fluid-permeable substrate. Fluid-permeable substrate 14H can take the form of, for example, horizontally oriented tubes or an air-porous strip, preferably on the order of about 12.5 cm (5 inches) wide by about 1.25 cm (0.5 inch) thick. The location of low-e element 20 with the embodiment of FIG. 9 may be at inner surface 18 of barrier 12 or at building surface 4, or both, depending primarily on the type of material used as the fluid-permeable substrate. When used with a flat roof, it is desired to use something which would help draw ambient air between barrier 12 and building surface 4, that is through fluid permeable substrate 14H. The embodiment of FIG. 9 illustrates use of a conventional, passively-driven wind vent 80. Instead of a wind vent, a fan or other type of air pump could be used as well, and the heat can be drawn off for use by the building.

Figure 10:
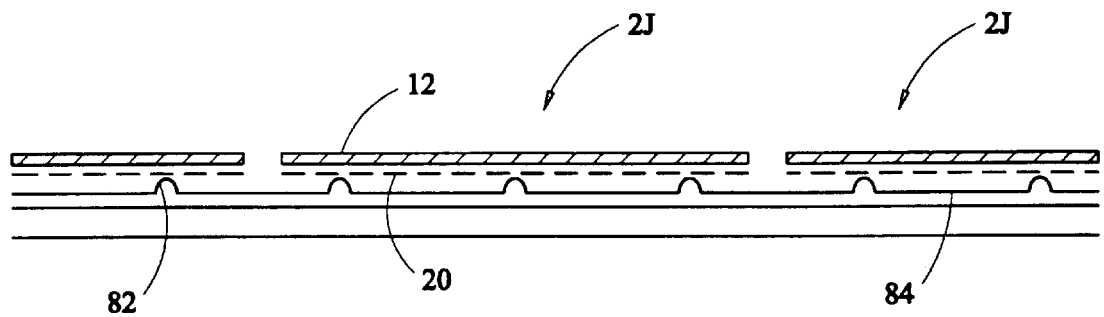
FIG. 10 is a simplified side cross-sectional view illustrating the invention used with a corrugated or standing-seam roofing system in which the upstanding corrugations or standing seams may provide the support for the barrier and create a vented cavity between the inner surface of the barrier and the building surface, which in this case is defined by the pans of the corrugated, standing seam roofing system.
Figure 10A:
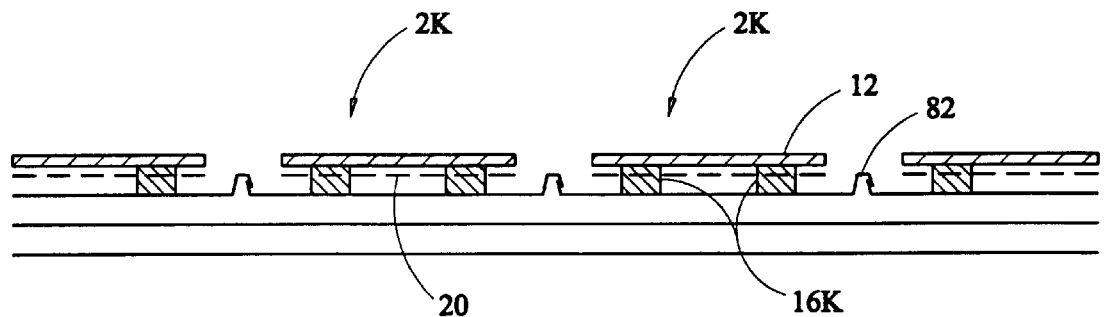
FIG. 10A illustrates an alternative embodiment of the invention of FIG. 10 in which the radiant barriers are supported using separate support elements between the corrugations or standing seams of the roofing system.

FIGS. 10A and 10B illustrate two further embodiments of the invention in which radiant barrier assemblies 2J and 2K are shown mounted to a standing seam or other corrugation type of roofing system. The roofing system includes standing seams 82 separated by generally flat panels or pans 84. In the embodiment of FIG. 10, barrier 12 is mounted to and spans a pair of standing seams 82 so that the standing seams lie below and possibly support the support assembly. In the embodiment of FIG. 10A, separate supports 16K are used to support barrier 12 between pairs of standing seams 82.

One preferred method for manufacturing of radiant barrier assembly 2 includes the steps of selecting a barrier, preferably a PV module having inner and outer surfaces 18, 22, and adhering a low-e element 20 to the inner surface. A support assembly 14 is then mounted to barrier 12 to create the assembly 2. This assembly can then be installed in the field directly to building surface 2. One or more additional low-e elements 20A, 20B can be used in the installation of the system. The support assembly can be secured to the building surface in a variety of ways, including the use of adhesives, clips, hook and loop fasteners, and other appropriate methods. Also, if the building surface includes a continuous layer of insulation, support assembly 14 can be designed to include a portion of the support assembly embedded within the continuous insulation layer and extending out and up through the outer surface of the insulation layer so that the insulation layer itself helps to secure the radiant barrier assembly to the building. In some situations inner surface 18 of barrier 12 will not include low-e element 20; in those situations low-e elements 20A and/or 20B may be used spaced apart from surface 18 to create the desired thermal isolation of building 10.

Modification and variation can be made to the disclosed embodiments without departing from the subject invention as defined in following claims.

All patents, applications and publications referred to above are hereby incorporated by reference.

What is claimed is:

1. A vented cavity radiant barrier assembly, for mounting to a building surface, comprising:

a barrier having inner and outer surfaces;

a support assembly secured to the barrier and extending inwardly relative to the inner surface, the support assembly having a part spaced-apart from the inner surface and securable to a building surface to enable a vented cavity to be created adjacent to the inner surface; and a low emissivity element associated with the inner surface.

2. The assembly according to claim 1 wherein the barrier comprises a photovoltaic module.

3. The assembly according to claim 1 wherein the barrier comprises a thermal insulation panel.

4. The assembly according to claim 1 wherein the support assembly is affixed to the inner surface.

5. The assembly according to claim 1 wherein the low-emissivity element comprises a coating on the inner surface.

6. The assembly according to claim 1 wherein the low-emissivity element is spaced-apart from the inner surface.

7. The assembly according to claim 6 wherein the low-emissivity element comprises a building surface-covering element.

8. The assembly according to claim 1 further comprising a base secured to the part of the support assembly, the base having a base outer surface so said vented cavity is created between the barrier inner surface and the base outer surface.

9. The assembly according to claim 8 wherein the low-emissivity element comprises a coating on the inner surface.

10. The assembly according to claim 8 wherein the low-emissivity element comprises a first low-emissivity layer adjacent to the inner surface and a second low-emissivity layer adjacent to the base outer surface.

11. The assembly according to claim 8 wherein the base comprises a layer of a thermal insulating material.

12. The assembly according to claim 11 wherein the layer of thermally insulating material has a thermal insulation value of at least about R3 per inch.

13. The assembly according to claim 8 wherein the part of the support assembly is embedded within the base.

14. The assembly according to claim 8 wherein the base is substantially larger than the barrier so said assembly is in the form of a shingle to permit said assembly to be fastened to a building surface using building surface-penetrating fasteners.

15. The assembly according to claim 1 wherein the part of the support assembly comprises at least one of:
   an adhesive application surface to which an adhesive can be applied to enable the part to be adhered to a building surface;
   a hook and loop fastener element; and
   a clip element.

16. The assembly according to claim 1 wherein the outer surface is a high-reflectivity, high-emissivity surface.

17. The assembly according to claim 1 wherein said spacer is about 1.2 cm to about 10 cm high.

18. The assembly according to claim 1 wherein the outer surface of the barrier comprises a photovoltaic module portion at a first angular orientation and a reverse-angle portion at a second angular orientation.

19. The assembly according to claim 1 wherein said support assembly further comprises interlocking elements to permit adjacent ones of said assemblies to be interlocked.

20. The assembly according to claim 1 wherein said support assembly comprises at least one of the following:
   a plurality of thermal insulation blocks;
   a plurality of stand-offs and associated hold-down elements; and
   first and second parallel, interlocking legs so that the first leg of one said radiant barrier assembly can be interlocked with the second leg of an adjacent said radiant barrier assembly.

21. The assembly according to claim 1 wherein said support assembly comprises a chosen one of:
   a standing seam roofing panel; and
   a corrugated roofing panel.

22. The assembly according to claim 1 wherein said support assembly comprises a fluid-permeable layer contacting the inner surface and at least substantially filling the vented cavity.

23. The assembly according to claim 1 wherein said low-emissivity element has an emissivity of no greater than about 0.4.

24. A vented cavity, photovoltaic (PV) assembly comprising:
   a PV module comprising outer and inner surfaces;
   a support assembly secured to the barrier and extending inwardly from the inner surface, the support assembly having a part spaced-apart from the inner surface and securable to a building surface to enable a vented cavity to be created adjacent to the inner surface; and
   said inner surface comprising a low-emissivity surface.

25. A vented cavity radiant barrier building assembly comprising:
   a building surface;
   a barrier having inner and outer surfaces;
   a support assembly mounting the barrier to the building surface with the inner surface spaced-apart from the building surface to define a vented cavity therebetween; and
   a low-emissivity element situated between the building surface and the inner surface.

26. The assembly according to claim 25 wherein the outer surface is generally parallel to the building surface.

27. The assembly according to claim 25 further comprising means for inducing air flow through the vented cavity.

28. The assembly according to claim 25 wherein the vented cavity has a cavity entrance and cavity exit, at least a part of said cavity exit being at a higher elevation than the cavity entrance so to promote air flow through the vented cavity.

29. The assembly according to claim 25 further comprising an air flow driver fluidly coupled to the vented cavity for urging air through the vented cavity.

30. The assembly according to claim 25 further comprising:
   a fastener securing the support assembly to the building surface.

31. The assembly according to claim 30 wherein the fastener comprises at least one of the following:
   an adhesive bonding the support assembly to the building surface;
   hook and loop fastener elements mounted to the support elements and the building surface;
   a base layer resting on the building surface within which an inner end of the support assembly is embedded.

32. The assembly according to claim 25 further comprising a base secured to the support assembly, the base having a base outer surface so said vented cavity is created between the barrier and the base outer surface.

33. The assembly according to claim 25 wherein the base comprises a layer of a thermal insulating material.

34. The assembly according to claim 25 wherein the base is substantially larger than the barrier so said assembly is in the form of a shingle to permit said assembly to be fastened to a building surface using building surface-penetrating fasteners.

35. The assembly according to claim 25 further comprises a first said low-emissivity element situated at the inner surface and a second said low-emissivity surface situated at the building surface.

36. A assembly according to claim 25 wherein the building surface is other than horizontal.

37. A method for making a vented cavity radiant barrier assembly comprising the following steps:
   selecting a barrier having inner and outer surfaces;
   applying a low-emissivity element to the inner surface; and
   mounting a support assembly to the barrier so that a part of the support assembly extends outwardly away from the inner surface.

38. The method according to claim 37 where in the barrier selecting step is carried out by selecting a photovoltaic module as the barrier.

39. The method according to claim 38 wherein securing step is carried out on an inclined building surface.

40. The method according to claim 39 wherein the securing step is carried out on an inclined building surface.

41. The method according to claim 39 wherein the securing step comprises the step of embedding lower ends of support assembly elements in a layer of thermal insulation on the building surface.

42. The method according to claim 39 further comprising the step of selecting a photovoltaic (PV) module as the barrier.

43. The method according to claim 42 further comprising the step of selecting a support assembly including a base mountable against an inclined building surface, said base having a base surface area at least 20% larger than said PV module.

44. The method according to claim 43 further comprising the step of mounting a plurality of said barrier assemblies with said bases overlapping in a shingled manner.

45. The method according to claim 39 further comprising the step of laterally interlocking adjacent ones of said barrier assemblies when mounting to said building surface.

46. The method according to claim 39 wherein the securing step comprises the step of enhancing convective air flow through the vented cavity by creating a cavity entrance and a cavity exit to said vented cavity and locating at least part of the cavity exit higher than the cavity entrance.

47. A vented cavity radiant barrier assembly, for mounting to a building surface, comprising:
- a photovoltaic (PV) module having inner and outer surfaces;
- a support assembly secured to the PV module and extending inwardly relative to the inner surface, the support assembly having a part spaced-apart from the inner surface and securable to a building surface to enable a vented cavity to be created adjacent to the inner surface;
- a base secured to the part of the support assembly, the base having a base outer surface so said vented cavity is created between the PV module inner surface and the base outer surface;
- the base being substantially larger than the PV module so said assembly is in the form of a shingle to permit said assembly to be fastened to a building surface using building surface-penetrating fasteners; and
- low-emissivity element between the base outer surface and the inner surface.

48. A vented cavity radiant barrier building assembly comprising:
- a building surface;
- a photovoltaic (PV) module having inner and outer surfaces;
- a support assembly mounting the PV module to the building surface with the inner surface spaced-apart from the building surface to define a vented cavity therebetween;
- a base secured to the support assembly, the base having a base outer surface so said vented cavity is created between the PV module and the base outer surface;
- the base being substantially larger than the PV module so said assembly is in the form of a shingle to permit said assembly to be fastened to a building surface using building surface-penetrating fasteners; and
- a low-emissivity element situated at or between the base outer surface and the inner surface.

49. A method for mounting a vented cavity radiant barrier assembly to a building surface comprising the following steps:
- securing a plurality of barrier assemblies to an inclined building surface, the barrier assemblies each comprising a photovoltaic (PV) module separated from a base by a support assembly with a low-emissivity element between the base and the PV module, said base having a base surface area at least 20% larger than said PV module, the barrier assemblies creating vented cavities between inner surfaces of the PV modules and the bases;
- said securing step further comprising overlapping said bases in a shingled manner.

50. The method according to claim 49 wherein the securing step comprises the step of embedding lower ends of support assembly elements in a layer of thermal insulation on the building surface.

* * * * *

UNITED STATES PATENT AND TRADEMARK OFFICE
CERTIFICATE OF CORRECTION

PATENT NO. : 6,061,978
DATED : May 16, 2000
INVENTOR(S) : Dinwoodie et al.

It is certified that error appears in the above-identified patent and that said Letters Patent is hereby corrected as shown below:

<u>Column 1,</u>
After the paragraph entitled "CROSS REFERENCE TO RELATED APPLICATIONS," please add the following:

-- FEDERALLY SPONSORED RESEARCH OR DEVELOPMENT
The U.S. Government has a paid-up license in this invention and the right in limited circumstances to require the patent owner to license others on reasonable terms as provided for by the terms of PVBonus Contract DE-FC36-97G010247 awarded by the Department of Energy. --

Signed and Sealed this

Twenty-ninth Day of April, 2003

JAMES E. ROGAN
*Director of the United States Patent and Trademark Office*